(12) United States Patent
Watkins

(10) Patent No.: US 6,766,844 B1
(45) Date of Patent: Jul. 27, 2004

(54) PEEL ASSEMBLY FOR A PRINTER

(75) Inventor: Dane Watkins, Chicago, IL (US)

(73) Assignee: Zih Corp., Hamilton (BM)

( * ) Notice: Subject to any disclaimer, the term of this patent is extended or adjusted under 35 U.S.C. 154(b) by 37 days.

(21) Appl. No.: 10/282,680

(22) Filed: Oct. 29, 2002

Related U.S. Application Data

(60) Provisional application No. 60/339,053, filed on Oct. 30, 2001.

(51) Int. Cl.[7] .............................................. B32B 35/00
(52) U.S. Cl. ....................... 156/584; 156/249; 156/344; 156/387; 101/44; 101/288
(58) Field of Search ................................ 156/344, 249, 156/387, 541, 542, 584; 101/288, 44; 400/611; 492/49, 56, 57

(56) References Cited

U.S. PATENT DOCUMENTS

| | | | | |
|---|---|---|---|---|
| 4,769,103 A | * | 9/1988 | Koike et al. ................ | 156/384 |
| 4,830,522 A | | 5/1989 | Sato et al. | |
| 5,169,476 A | * | 12/1992 | Silveira et al. ............. | 156/344 |
| 5,188,029 A | * | 2/1993 | Sugimoto et al. ........... | 101/288 |
| 5,229,587 A | | 7/1993 | Kimura et al. | |
| 5,295,753 A | | 3/1994 | Godo et al. | |
| 5,326,182 A | | 7/1994 | Hagstrom | |
| 5,427,460 A | * | 6/1995 | Kajiya ..................... | 400/118.1 |
| 5,447,379 A | * | 9/1995 | Pou .............................. | 400/88 |
| 5,478,428 A | * | 12/1995 | Carpenter .................... | 156/344 |
| 5,573,631 A | * | 11/1996 | Campbell et al. ......... | 156/583.1 |
| 5,713,679 A | * | 2/1998 | Taylor ........................ | 400/621 |
| 5,718,525 A | | 2/1998 | Bruhnke et al. | |
| 5,775,820 A | | 7/1998 | Sugimoto et al. | |
| 5,938,350 A | | 8/1999 | Colonel | |
| 5,980,138 A | | 11/1999 | Shiozaki et al. | |
| 6,068,419 A | | 5/2000 | Shiozaki et al. | |
| 6,092,945 A | * | 7/2000 | Takami et al. .............. | 400/613 |
| 6,130,699 A | | 10/2000 | Christensen et al. | |
| 6,261,009 B1 | * | 7/2001 | Petteruti et al. ............. | 400/61 |
| 6,349,756 B1 | | 2/2002 | Brough et al. | |
| 6,530,705 B1 | * | 3/2003 | Petteruti et al. ............ | 400/611 |

* cited by examiner

Primary Examiner—Mark A. Osele
(74) Attorney, Agent, or Firm—Trexler, Bushnell, Giangiorgi, Blackstone & Marr, Ltd.

(57) ABSTRACT

A peel assembly for separating a label from a liner is provided. The assembly includes a structure for mounting the assembly to a printer, a structure for driving the liner and labels through the assembly, a stripper for bending the liner therearound, a plurality of deflector rollers proximate to the stripper for deflecting the liner away from the label and towards the stripper, a pinch roller and a spring. The pinch roller has a diameter of at least 0.385 inches and is formed from a material for creating tension in the liner allowing for better peel performance. The spring places force on the pinch roller and presses the pinch roller against a platen roller. Slots in the structure for mounting the assembly to the printer allow the pinch roller to float in the direction of spring force.

33 Claims, 8 Drawing Sheets

PEEL ASSEMBLY FOR A PRINTER

CROSS-REFERENCE

This patent application claims the benefit of domestic priority of U.S. Provisional Application Ser. No. 60/339,053, filed Oct. 30, 2001, and entitled "Peel Assembly For A Printer".

BACKGROUND OF THE INVENTION

This invention is generally directed to a peel assembly for a printer. More particularly, the invention contemplates a peel assembly for separating labels from a releasable liner or backing.

When a media is formed of labels on a liner, the labels may be separated or peeled off of the liner by a printer instead of dispensing the label on the liner and requiring that the user hand strip the label. One prior art method of separating a label from a liner includes providing a separate motor-driven spindle which places tension on the liner. This tension is used to pull media over an edge, separating the label from the liner.

Another prior art method of separating a label from a liner includes providing a pinch roller that is forced against a platen roller such that the liner passes therebetween. The "pinch" created helps to pull media through the printer and applied tension to the liner. The prior art pinch rollers were very small (about 0.25 inches in diameter) and very hard. Therefore, the prior art peel assemblies could not run at high speeds and produce quality results.

The present invention provides a novel peel assembly which is a purely mechanical means used to separate or peel the labels easily from the liner. This simplifies peeling, removes the need for other parts or assemblies, allows for higher speeds and better peel performance than prior art peel assemblies, and reduces cost. Other features and advantages of the present invention will become apparent upon a reading of the attached specification, in combination with a study of the drawings.

OBJECTS AND SUMMARY OF THE INVENTION

A general object of the present invention is to provide a novel peel assembly that is used to separate or to peel the labels from a releasable liner or backing.

Another object of the present invention is to provide a novel peel assembly for peeling labels from a releasable liner or backing that includes deflector rollers to increase the peel angle.

Yet another object of the present invention is to provide a novel peel assembly that uses a pinch roller peel design to pull media through a printer with a pinch roller of at least 0.385 inches in diameter, and preferably at least 0.5 inches in diameter, wherein the pinch roller is formed from a material which allows for higher speed running of the printer and increased tension on the liner allowing for better peel performance.

Still another object of the present invention is to provide a novel peel assembly that uses a pinch roller peel design to pull media through a printer wherein a spring is used to generate the pinch.

Yet another object of the present invention is to provide a novel peel assembly that uses a pinch roller peel design to pull media through a printer wherein slots are included in the peel assembly that are means for allowing a pinch roller to float in the direction of spring force.

Another object of the present invention is to provide a printer which has the capability of changing from a mode intended for peeling printed labels from a liner to a mode intended for rewinding printed labels onto a take-up spindle.

Briefly, and in accordance with the foregoing, the present invention discloses a novel peel assembly for separating a label from a releasable liner or backing. The peel assembly can be used on a printer. The peel assembly includes a structure for mounting the peel assembly to the printer, a structure for driving the liner and labels through the peel assembly, a stripper for bending the liner therearound, a plurality of deflector rollers proximate to the stripper for deflecting the liner away from the label and towards the stripper, a pinch roller and a spring. The pinch roller has a diameter of at least 0.385 inches, and preferably at least 0.5 inches in diameter, and is formed from a material for creating tension in the liner allowing for better peel performance. The spring places force on the pinch roller and presses the pinch roller against a platen roller. Slots in the peel assembly allow the pinch roller to float in the direction of spring force. After the liner, which has the labels thereon, passes over the stripper, the liner is passed between the stripper and the deflector rollers and then between the pinch roller and the platen roller, and the label exits out the front of the printer. The printer can also be fitted with a front ribbed piece which allows the printed labels to not be peeled from the liner, but rather rewound onto a take-up spindle.

BRIEF DESCRIPTION OF THE DRAWINGS

The organization and manner of the structure and operation of the invention, together with further objects and advantages thereof, may best be understood by reference to the following description, taken in connection with the accompanying drawings, wherein like reference numerals identify like elements in which.

DETAILED DESCRIPTION OF THE ILLUSTRATED EMBODIMENT

Figure 1:
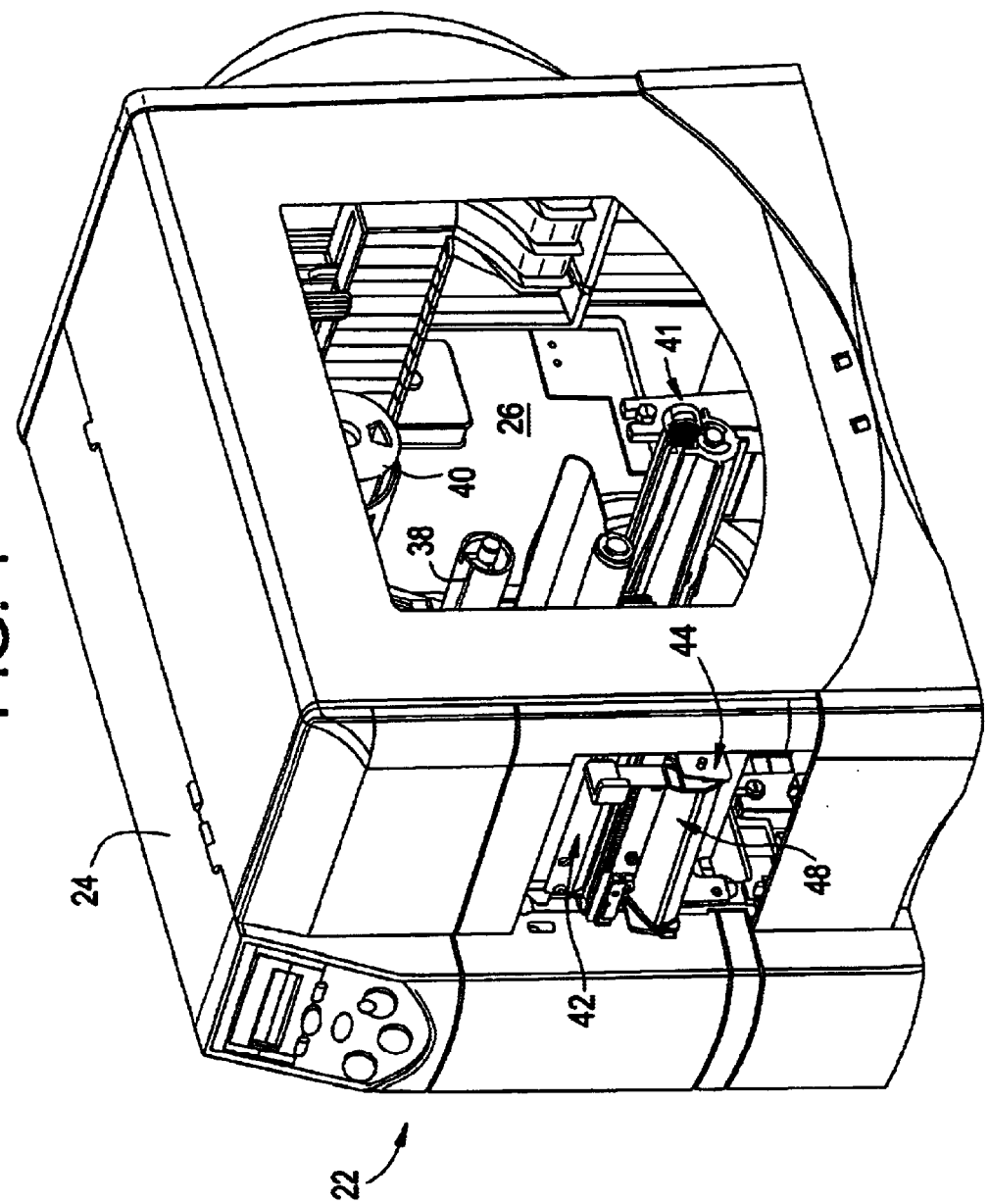
FIG. 1 is a partial perspective view of a printer, showing the closed position of a peel assembly which incorporates the features of the present invention, and some of the internal components of a printer.

While the invention may be susceptible to embodiment in different forms, there is shown in the drawings, and herein will be described in detail, a specific embodiment with the understanding that the present disclosure is to be considered an exemplification of the principles of the invention, and is not intended to limit the invention to that as illustrated and described herein.

A novel peel assembly 42 for a printer 22 is provided. The printer 22 is preferably a thermal demand printer. Indicia is printed on a media 30 by using an ink ribbon (not shown). The media 30 is formed from a continuous releasable liner 34 (also known as a backing or a web) having a plurality of labels 36 releasably secured thereto. The labels 36 are releasably secured to the liner 34 by a releasable adhesive. The labels 36 are spaced apart from each other on the liner 34. The media 30 is driven through the printer 22 by conventional means as described further herein. As the media 30 is driven through the printer 22, it passes through the peel assembly 42 of the present invention. The peel assembly 42 separates the labels 36 from the releasable liner 34 as described herein.

The printer 22 has a housing 24 which houses various operating components. The housing 24 has a plurality of ports, serial and/or parallel, thereon for connection to external devices, such as a CPU and a monitor, a plug for connection of a power source thereto, and an on/off switch for turning the printer 22 on or off. Ventilation apertures are provided on the housing 24. A central support wall 26 is provided within the housing 24 and extends perpendicularly from a bottom wall of the housing 24 and is secured thereto.

Figure 2:
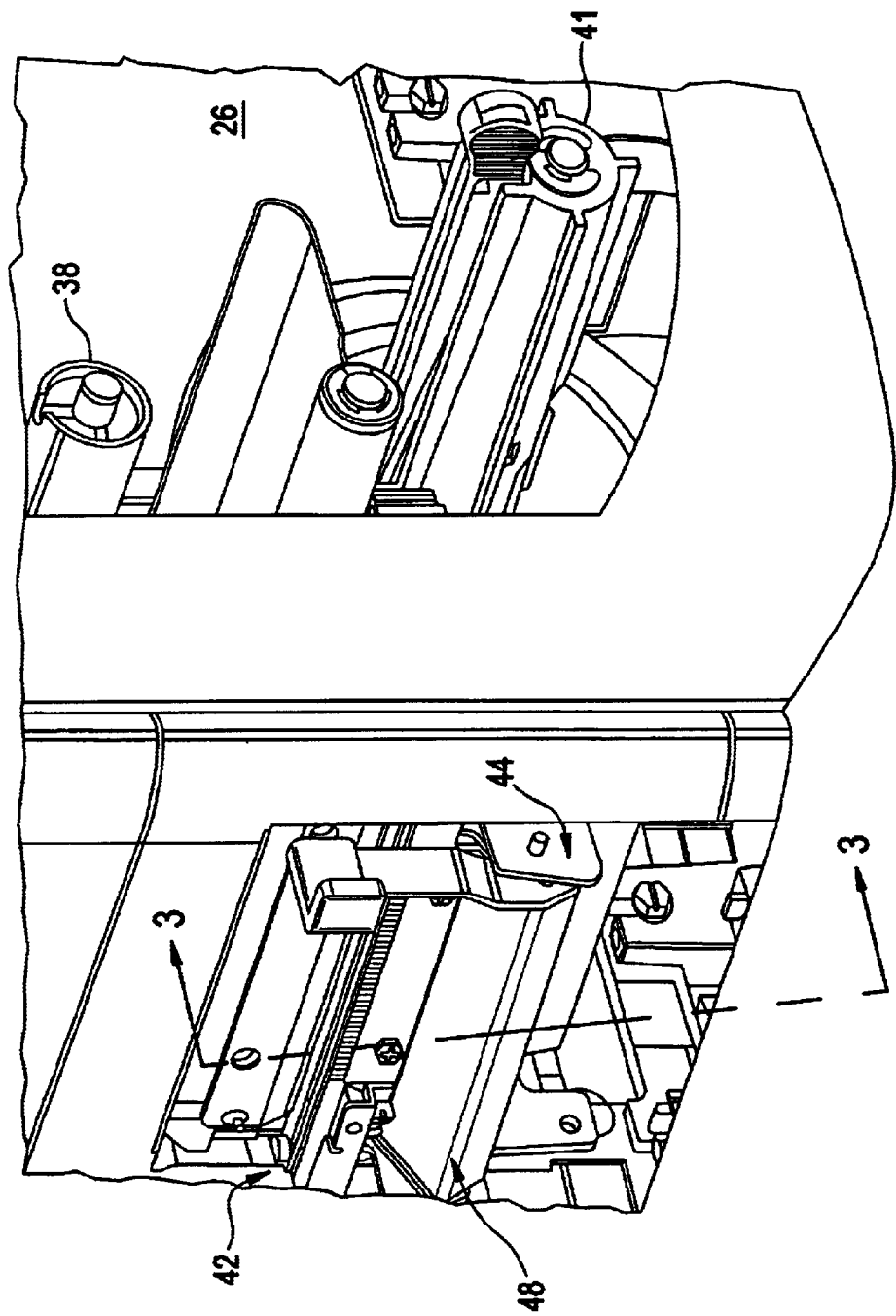
FIG. 2 is an enlarged, perspective view of a portion of the printer of FIG. 1.
Figure 3:
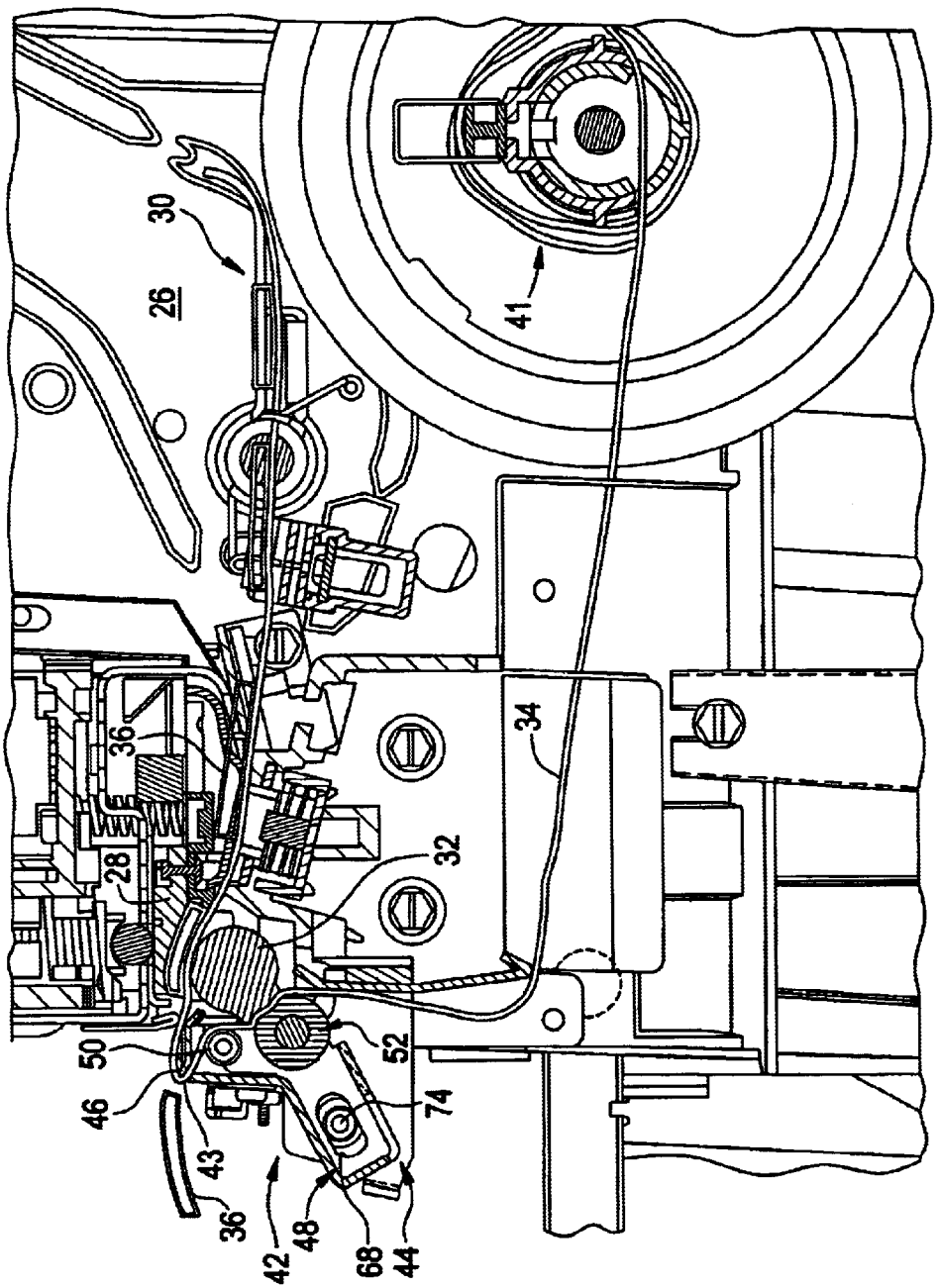
FIG. 3 is a cross-sectional view of the printer along line 3—3 of FIG. 2.

FIGS. 1–3 shows some of the internal components of the printer 22 on one side of the central support wall 26. Electronics are also provided within the printer 22 and may be on the other side of the central support wall 26.

A conventional printhead assembly 28 is provided and includes a conventional printhead support and conventional printhead means fixedly attached thereto. The printhead means is comprised of an array of heating elements which are selectively energized. Energizing selected heating elements of the array produces a single line of a printed image by heating a thermally sensitive paper, ribbon, or some other member (not shown). While ribbon is described herein, it is to be understood that these other types of members are suitable, along with other types of members known in the art. Complete images are printed by repeatedly energizing varying patterns of the heating elements while moving media 30 past the printhead means. Power to the printhead means is supplied by a power source which is wired thereto by a cable which passes from the power supply through the central support wall 26.

Conventional ribbon delivery means are provided for delivering the ribbon (not shown) to the printhead means. The ribbon delivery means generally includes a ribbon supply spindle 38 and a ribbon take-up spindle 40. The ribbon is a thermally activated ribbon which transfers ink onto the labels 36 when the printhead means is thermally activated by suitable electronics.

The ribbon supply spindle 38 is cantilevered from the central support wall 26 such that the ribbon supply spindle 38 extends outwardly and perpendicularly therefrom. The ribbon supply spindle 38 is rotatable relative to the central support wall 26. Suitable conventional driving means (not shown) are provided for driving the ribbon supply spindle 38.

The ribbon take-up spindle 40 is cantilevered from the central support wall 26 such that the ribbon take-up spindle 40 extends outwardly and perpendicularly therefrom. The ribbon take-up spindle 40 is rotatable relative to the central support wall 26. Suitable conventional driving means (not shown) are provided for driving the ribbon take-up spindle 38. The ribbon take-up spindle 40 is spaced apart from the ribbon supply spindle 38 on the central support wall 26.

Conventional media delivery means is provided for delivering the media 30 to the printhead means. The media delivery means includes a conventional positively-driven platen roller 32. The platen roller 32 preferably is formed of rubber. The platen roller 32 is rotated by suitable driving means to drive the media 30 through the printer 22. The platen roller 32 is cylindrical and typically rubber coated and extends perpendicularly outwardly from the central support wall 26 and is rotatably mounted thereto. The platen roller 32 has a shaft that extends through the central support wall 26 and connects with a driving system (not shown). As the media 30 is further advanced by the platen roller 32, the releasable liner 34 is separated from the labels 36 by the peel assembly 42 of the present invention, as described herein, and is preferably rewound onto a liner only spindle 41 or can fall freely onto the ground. The media 30 is fed into the printer 22 from a roll provided on a media supply spindle (not shown) within the printer 22 or from a source outside of the printer 22.

As shown in FIGS. 3–7, the novel peel assembly 42 of the present invention includes a mounting bracket 44 which is mounted to the printhead support of the printhead assembly 28. A pivot bracket 48 is pivotally attached to the mounting bracket 44 and has a plurality of ribbed deflector rollers 50 and a pinch roller 52 thereon.

The mounting bracket 44 preferably has a flat middle portion 54, first and second arms 56, 58 at each end of the middle portion 54 and which extend perpendicularly thereto, and a tab 57, 59 provided on each arm 56, 58. The tabs 57, 59 extend perpendicularly to the respective arm 56, 58. The flat middle portion 54 has a pair of spaced apart apertures 55 provided therethrough. Each arm 56, 58 has an aperture 60 provided therethrough, and each tab 57, 59 has an aperture 61 provided therethrough. A stripper 46, such as a wire or a bar that could be flat, is fixedly mounted on the tabs 57, 59 by screws 82, 84 which extend through the stripper 46 and through the apertures 61. The stripper 46 extends across the length of the mounting bracket 44. The stripper 46 preferably has a small radius. The mounting bracket 44 is mounted to the printhead support of the printhead assembly 28 by suitable means such as screws through the apertures 55 in the middle portion 54.

Figure 6:
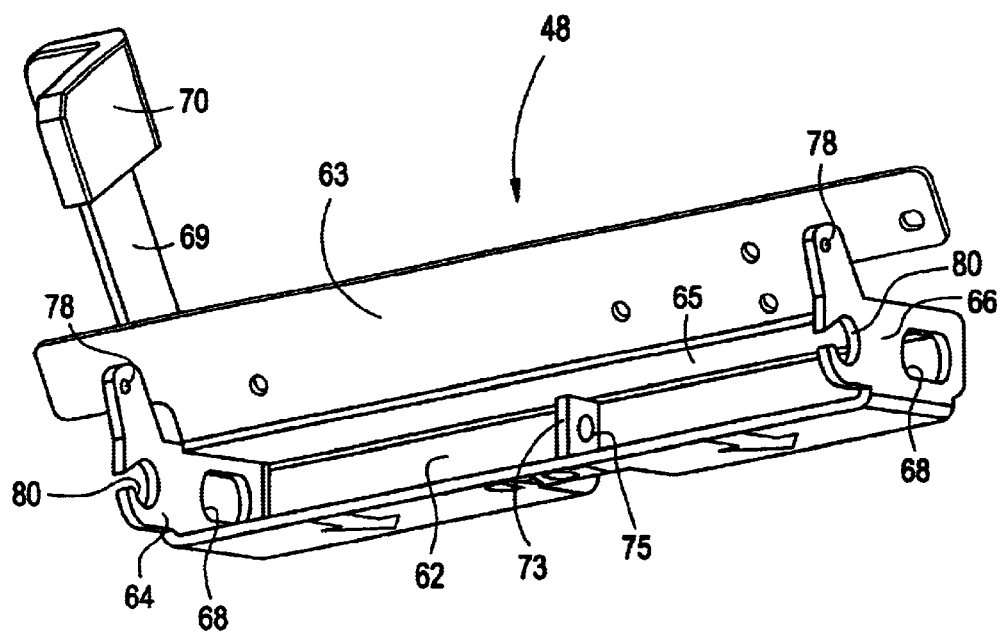
FIG. 6 is a perspective view of one of the components of the peel assembly.
Figure 7:
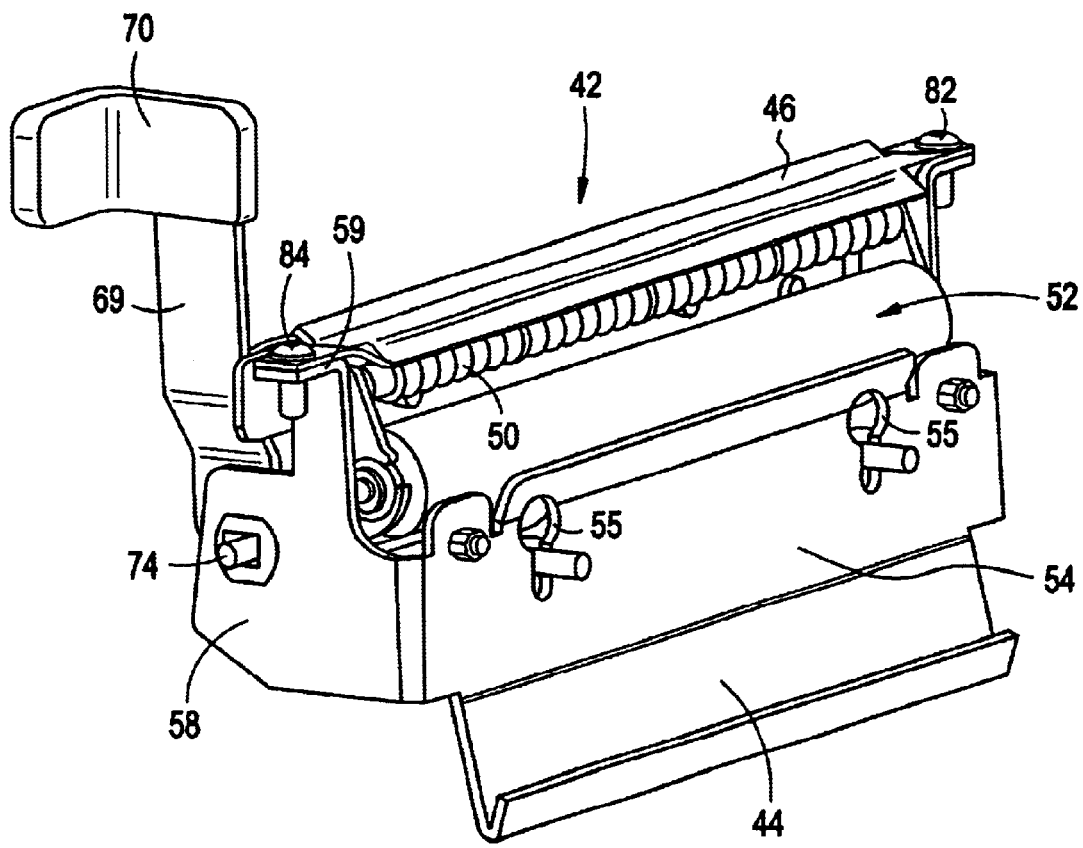
FIG. 7 is a perspective view of the peel assembly.

The pivot bracket 48 has a body portion 62, side portions 64, 66 at each end of the body portion 62, and a middle tab portion 73, see FIG. 6. As shown in FIGS. 3–7, the body portion 62 is preferably shaped such that it has a top half 63 that is flat and a bottom half 65 that is generally "U" shaped and angled relative to the top half 63.

The middle tab portion 73 is provided in the bottom half 65 at approximately the midpoint of the U-shaped bottom half 65. The middle tab portion 73 includes an aperture 75 therethrough for reasons described herein.

Each side portion 64, 66 has an elongated slot 68 provided therethrough which aligns with the apertures 60 in the arms 56, 58 of the mounting bracket 44 as further discussed herein. Each side portion 64, 66 further includes an aperture 78 into which a shaft 76 is engaged, and a notch 80 into which a shaft 77 is engaged. The aperture 78 and the notch 80 on the respective side portion 64, 66 are spaced apart from each other a predetermined distance.

The shaft 76 has a plurality of ribbed deflector rollers 50 mounted thereon, and is non-rotatably mounted within the apertures 78 of the side portions 64, 66 by suitable means and between the side portions 64, 66. The shaft 76 is constrained axially. The ribbed deflector rollers 50 are free to rotate relative to the shaft 76. Each ribbed deflector roller 50 has surface geometry to minimize surface area contact with the liner 34. It should be noted that each ribbed deflector roller 50 could be broken into a larger number of smaller rollers or an equivalent structure formed of a plurality of individual rollers of alternating diameters and such structures are intended to fall within the scope of the invention.

The shaft 77 has a resilient or rubber surface 82 thereon and forms the pinch roller 52. The pinch roller 52 is at least 0.385 inches in diameter, and preferably is at least 0.5 inches in diameter. A diameter of 0.375 inches is a standard size for pinch rollers, but pinch rollers of this size and smaller are not sufficient to create the desired "pinch", as will be discussed further herein. The pinch roller 52 is "springy" or "spongy" because of its resilient or rubber surface 82. The pinch roller 52 is preferably formed of rubber.

The pinch roller 52 is rotatably engaged with the notches 80 of the side portions 64, 66 and between the side portions 64, 66 at a predetermined distance from the top of the pivot bracket 48. The pinch roller 52 is mounted near the shaft 76 with ribbed deflector rollers 50 thereon, but the pinch roller 52 does not touch the ribbed deflector rollers 50.

The pivot bracket 48 fits between the arms 56, 58 of the mounting bracket 44 such that the slots 68 in the side portions 64, 66 of the pivot bracket 48 align with the apertures 60 in the arms 56, 58 of the mounting bracket 44. A spring 74, such as a wire spring, a flat spring, or a two compression spring, passes through the aperture 60 in the arm 56, through the slot 68 in the side portion 66, through the aperture 75 in the middle tab portion 73, through the slot 68 in the side portion 64 and through the aperture 60 in the arm 58. The spring 74 pivotally secures the pivot bracket 48 to the mounting bracket 44. Mounting means are provided for securing the spring 74, the pivot bracket 48 and the mounting bracket 44 together. The elongated slots 68 allow the pivot bracket 48 to float toward and away from the mounting bracket 44 as further described herein. The pinch roller 52, which is mounted to the pivot bracket 48, thus lines up with the platen roller 32 and exerts equal force, or "pinch," over the length of the platen roller 32.

At least one of the side portions 64, 66 is preferably formed such that it has an extension 69. In the drawings, side portion 64 is illustrated to have the extension 69. A handle 70 is provided at the end of extension 69 for allowing a user to manually rotate the pivot bracket 48 relative to the mounting bracket 44. The handle 70 is generally "L" shaped and includes a finger-gripping portion 71.

The peel assembly 42 can be opened and closed by rotating the pivot bracket 48 about the axis of the spring 74 counterclockwise, and then by rotating the pivot bracket 48 clockwise. The rotation of the pivot bracket 48 occurs by the user pulling or pushing on the handle 70.

When the pivot bracket 48, having the ribbed deflector rollers 50 and the pinch roller 52 thereon, is rotated counterclockwise, causing the peel assembly 42 to be in an open position, the pinch roller 52 is moved away from engagement with the platen roller 32. In addition, the spring 74 is positioned in its naturally straight position. This allows a user to easily feed liner 34 between the stripper 46 and the ribbed deflector rollers 50 and further between the platen roller 32 and the pinch roller 52.

The pivot bracket 48 can then be rotated clockwise thereby closing the peel assembly 42 and moving the pinch roller 52 into engagement with the platen roller 32. Because the pinch roller 52 and the platen roller 32 overlap each other, the engagement of the pinch roller 52 with the platen roller 32 causes the pivot bracket 48 and the pinch roller 52 to move away from the mounting bracket 44 and the platen roller 32. The ends of the spring 74 are fixed by the mounting bracket 44, whereas the middle of the spring 74 is held by the tab portion 73 in the pivot bracket 48. When the pivot bracket 48 moves away from the mounting bracket 44, the spring 74 deflects. When the spring 74 is deflected, the spring 74 tries to return to its normally straight configuration, and therefore, the spring 74 places a force on the pivot bracket 48, moving the pivot bracket 48 toward the mounting bracket 44 such that the pinch roller 52 is caused to press against the platen roller 32. This pinches the liner 34 between the platen roller 32 and the pinch roller 52 and creates tension in the liner 34. The large diameter of the pinch roller 52, 0.385 inches in diameter or larger, creates a larger tension in the liner 34 than smaller rollers, those with a diameter of 0.375 inches or less, which allows for much better peel performance, as previously discussed. The pivot bracket 48 is permitted to move relative to the mounting bracket 44 because of the deflection of the spring 74 and because of the slots 68 of the pivot bracket 48.

When the pinch roller 52 is pressed against the platen roller 32, as described herein, increased tension results from overdrive on the media 30 created in the contact zone of the pinch roller 52 and the platen roller 32, defined as the pinch roller nip 88. Overdrive occurs when there is a difference of speed in the media 30, in this situation at the printhead nip 86, which is defined by the contact zone of the printhead assembly 28 and the platen roller 32, versus the pinch roller nip 88. The speed of the media 30 at the pinch roller nip 88 is faster than at the printhead nip 86 such that a constant tug on the media 30 is created. This is because the pinch roller nip 88 is downstream of the printhead nip 86 and the platen roller 32 is the speed regulator. If the speed at the printhead nip 86 was faster than at the pinch roller nip 88, a tug would not be created and instead an ever-increasing slack loop would occur. The media 30 does not stretch and can only proceed at one speed. If the pinch roller 52 influences the media 30 to go faster, but the platen roller 32 regulates the speed, the effect is tension or tug on the media 30, with slippage occurring. This is how overdrive creates more tension in the media 30.

Figure 4:
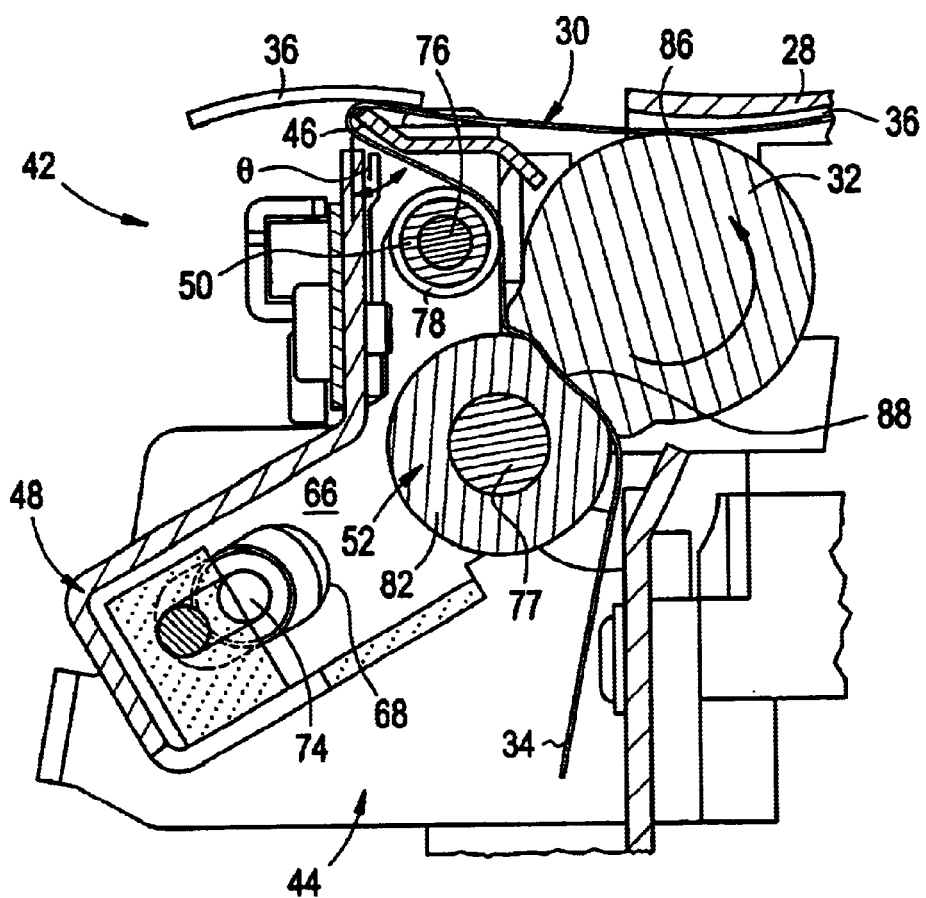
FIG. 4 is an enlarged, partial cross-sectional view of the printer.
Figure 5:
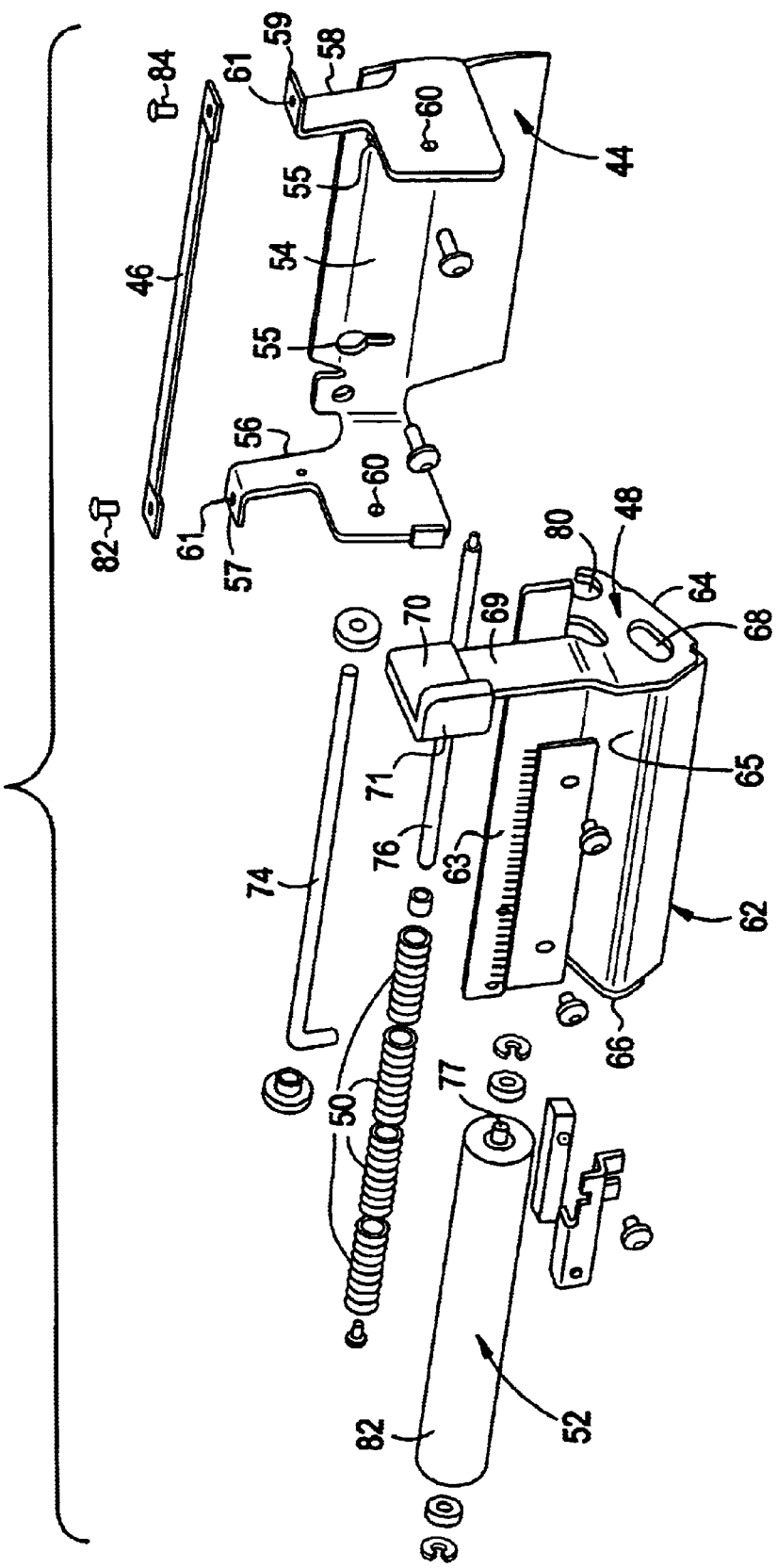
FIG. 5 is an exploded, perspective view of the components of the peel assembly.

Higher speed is generated by the pinch roller 52 creating a stretch in the outer surface of the platen roller 32, see FIG. 4. For a given rotation of the platen roller 32, the distance the media 30 travels at the printhead nip 86 is less than the stretched area at the pinch roller nip 88. This creates the speed difference or overdrive.

The stretch of the platen roller 32 is improved in the following ways:

1. A large diameter pinch roller 52: this increases the contact footprint on the platen roller 32, $\epsilon$(lateral strain)= $\Delta L/L$, where L is the contact footprint the pinch roller 52 places onto the platen roller 32 and $\Delta L$ is the change in this footprint on the platen roller 32, i.e. or stretch or bulge. For a given material strain ($\epsilon$), a larger pinch roller diameter increases the contract footprint (L) which will then lead to a larger stretch or bulge of the platen roller 32 ($\Delta L$), increasing overdrive.

2. Large Poisson's ratio, or "spongy": this is a material property defined as $\nu=-$(lateral strain)/(axial strain)$=-(\epsilon\_L)/(\epsilon\_A)=-(\Delta L/L)/(\Delta A/A)$. This is the amount of the bulge from the sides (lateral strain), as material is pushed in (axial strain). In our case, A is the original contact footprint for either the pinch roller 52 or the platen roller 32, and $\Delta A$ is the change in this footprint. L is the original amount of stretch or bulge in the contact footprint of the pinch roller 52 or platen roller 32 and $\Delta L$ is the change in this stretch or bulge. For the platen roller 32, a higher $\nu$ means more stretch per amount of contact with the pinch roller 52. For the pinch roller 52, a higher $\nu$ means a larger pinch roller nip 88 which increases the stretch or bulge, per number 1 above.

Thus, for best results of overdrive, Poisson's ratio should be large and should have a positive value. As Poisson's ratio increases, overdrive increases.

As discussed, the pinch roller 52 creates a stretch on the platen roller 32 when the pinch roller 52 is forced against the platen roller 32 which allows for increased tension on the liner 34 which passes therebetween and higher speed running of the printer 22. The hard, or rigid, pinch rollers of prior art peel assemblies do not create as much tension as the pinch roller 52 of the present invention, nor do they allow for higher speed running of the printer.

In use, the platen roller 32 is driven to pull the media 30 from the media supply spindle or from the source outside of the printer 22. The media 30 passes between the platen roller 32 and the printhead means. The printhead means thermally prints images onto the label 36 as the label 36 passes thereunder. The liner 34 is bent around the stripper 46 of the peel assembly 42 to peel the printed-on label 36 therefrom. The liner 34 then passes between the ribbed deflector rollers 50 and the stripper 46, which is immediately adjacent to the ribbed deflector rollers 50. By deflecting the liner 34 in from the stripper 46, the peel angle $\Theta$ is increased, which assists in peeling the labels 36 away from the liner 34. The liner 34 then passes between the pinch roller 52 and the platen roller 32. The pinch roller 52 is pressed against the platen roller 32 which pinches the liner 34 against the platen roller 32 and creates tension in the liner 34. The larger diameter of the pinch roller 52, which is at least 0.385 inches in diameter, and preferably at least 0.5 inches in diameter, creates a greater tension on the liner 34 when the liner 34 passes between the pinch roller 52 and the platen roller 32, thus allowing for much better peel performance than the prior art. Prior art pinch rollers were no larger than 0.375 inches as 0.375 inches in diameter is a standard size diameter for rollers in printers. The printed-on labels 36 exit out the front of the printer 22, while the liner 34 is preferably rewound onto the liner only spindle 41.

A prior art printer 22 can be easily modified to include the peel assembly 42 of the present invention.

It has also been determined that the ribbon (not shown) in a thermal printer decreases the overdrive to the peel assembly 42. This is why the pinch force at the pinch roller nip 88 needs to be high. The reason for this is because ribbon reduces $\mu$ (coefficient of friction), which allows media 30 to slip between the printhead means and the platen roller 32. This slippage reduces the difference between the velocity at the pinch roller nip 88 versus at the printhead nip 86.

It should be noted that while the pinch roller 52 is used for peeling labels in the present invention, the pinch roller 52 of the present invention can be used in any mechanism where creating tension in a web is important.

Figure 8:
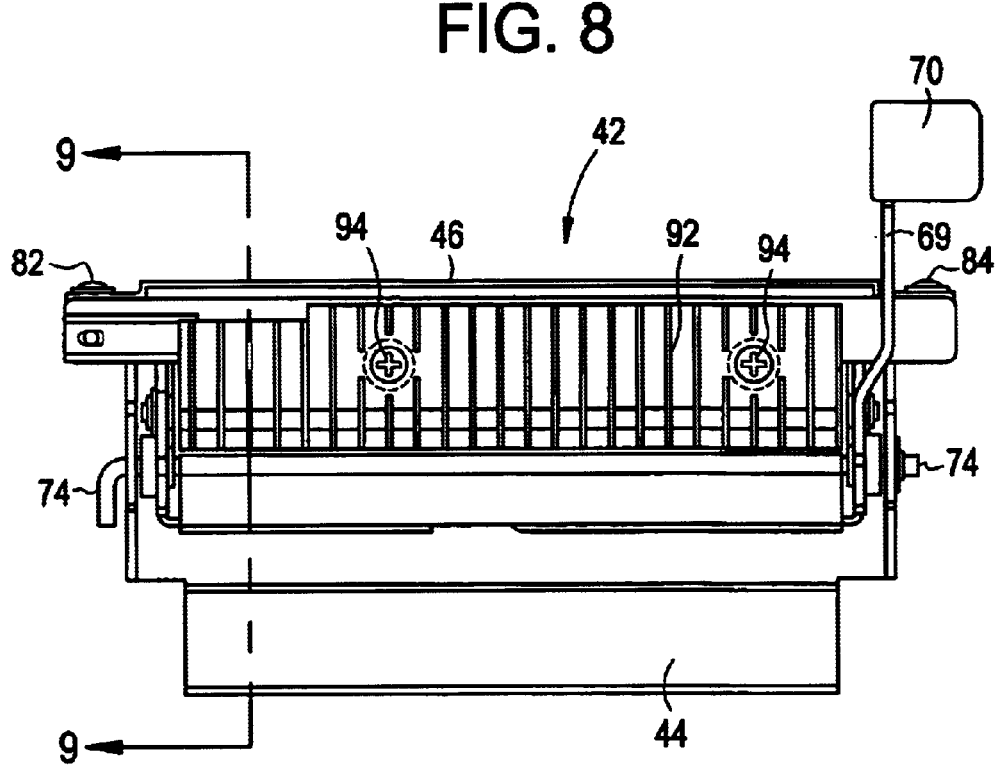
FIG. 8 is a front-elevational view of the peel assembly which includes a front ribbed piece thereon.
Figure 9:
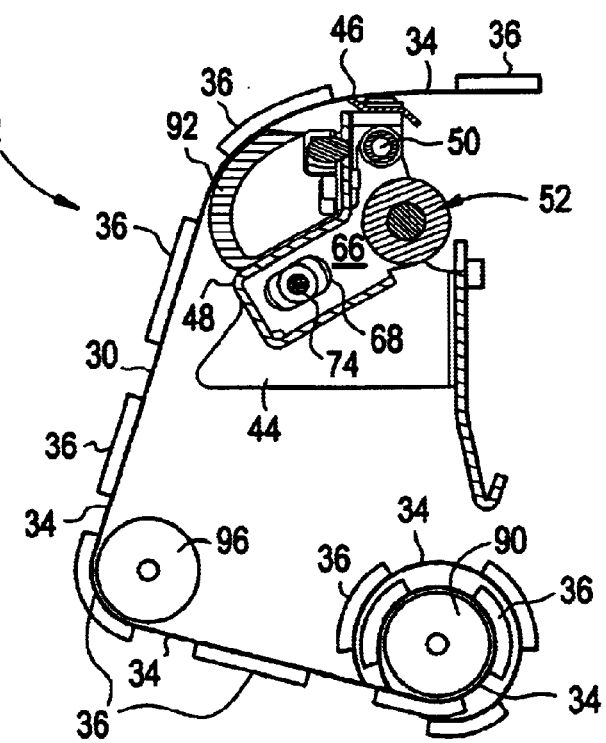
FIG. 9 is a cross-sectional view of the peel assembly along line 9—9 of FIG. 8 illustrating printed labels and liner being rewound onto a full-roll take-up spindle.

It should further be noted that the printer 22 can be put in a mode of operation which does not provide for the peeling of the labels 36 from the releasable liner 34, but rather allows the media 30 to be rewound onto a full-roll take-up spindle 90, as illustrated in FIGS. 8 and 9. Such a mode of operation may be desirable if the labels 36 are not to be peeled from the releasable liner 34 immediately after the labels 36 are printed upon by the printer 22. In such operation, a ribbed piece 92 is releasably secured to the peel assembly 42 by appropriate means, such as screws 94, at a front of the printer 22. An idler roll 96 and a media take-up spindle 90 are provided below the ribbed piece 92 and the peel assembly 42. The media take-up spindle 90 may be the liner only spindle 41, or it may be a separate spindle. In this mode, the liner 34 is not positioned within the peel assembly 42 such that the liner 34 moves between the pinch roller 52 and the platen roller 32, thus forcing the liner 34 to be pulled away from the label 36 at the stripper 46. Rather, the labels 36 are not separated from the liner 34; the media 30 passes over the stripper 46 and over the ribbed piece 92. The piece 92 is ribbed to allow the media 30 to more easily move over the piece 92. The media 30 then moves around the idler roller 96 to the media take-up spindle 90, where the media 30 is rewound. The rewound media 30 can then be removed from the take-up spindle 90 such that the labels 36 can be removed from the liner 34 at a different time or place, as desired.

While a preferred embodiment of the present invention is shown and described, it is envisioned that those skilled in the art may devise various modifications of the present invention without departing from the spirit and scope of the appended claims.

The invention is claimed as follows:

1. A peel assembly capable of separating a label from a liner, the label when on the liner forming a media, said peel assembly comprising:

a platen roller;

a bracket assembly;

a stripper which is mounted to said bracket assembly, said stripper capable of stripping the label away from the liner upon tension being applied to the liner; and a pinch roller connected to said bracket assembly, said pinch roller having a diameter of at least 0.385 inches, said pinch roller being engaged against said platen roller such that the liner moves between said pinch roller and said platen roller and said pinch roller pinches the liner between said platen roller and said pinch roller to create tension in the liner.

2. A peel assembly as defined in claim 1, wherein said pinch roller has a diameter which is at least 0.5 inches in diameter.

3. A peel assembly as defined in claim 1, wherein said pinch roller has a resilient surface.

4. A peel assembly as defined in claim 3, wherein said resilient surface of said pinch roller is formed of rubber.

5. A peel assembly as defined in claim 1, wherein a printhead nip is defined at the contact zone of a printhead assembly and said platen roller, and wherein a pinch roller nip is defined at the contact zone of said platen roller and said pinch roller, said engagement of said pinch roller and said platen roller creates a stretch in an outer surface of said platen roller such that for a given rotation of said platen roller, the liner travels a shorter distance at said printhead nip than at said pinch roller nip.

6. A peel assembly as defined in claim 1, further including at least one deflecting roller for deflecting the liner away from the label, said at least one deflecting roller being connected to said bracket assembly and being positioned between and relative to said stripper and said pinch roller to provide a large peel angle.

7. A peel assembly as defined in claim 6, wherein said at least one deflecting roller is ribbed such that said at least one deflecting roller has a surface geometry which minimizes surface area contact with the liner.

8. A peel assembly as defined in claim 1, wherein said bracket assembly includes a mounting bracket and a pivot bracket, said stripper being mounted to said mounting bracket, said pivot bracket being attached to said mounting bracket, said pinch roller being connected to said pivot bracket, wherein movement of said pivot bracket is capable of engaging and disengaging said pinch roller with said platen roller.

9. A peel assembly as defined in claim 8, wherein a spring secures said pivot bracket to said mounting bracket, said spring capable of being deflected, and wherein deflection of said spring forces said pinch roller to pinch the liner between said platen roller and said pinch roller.

10. A peel assembly as defined in claim 9, wherein said mounting bracket has a pair of side portions, each said side portion having an aperture therethrough, said apertures being in alignment with one another, and wherein said pivot bracket has a pair of side portions and a tab portion therebetween, each said side portion having a slot therethrough, said tab portion having an aperture therethrough, said slots and said aperture of said tab portion being in alignment with each other, said slots being larger than said apertures of said mounting bracket, said pivot bracket being sized such that said pivot bracket can be placed between said side portions of said mounting bracket and such that said slots and said apertures are in alignment with one another.

11. A peel assembly as defined in claim 10, wherein said spring extends through said slots and said apertures, said spring capable of moving within said slots such that said pivot bracket is capable of floating relative to said mounting bracket such that said pinch roller can float toward and away from said platen roller.

12. A peel assembly as defined in claim 11, wherein said spring pivotally secures said pivot bracket to said mounting bracket.

13. A peel assembly as defined in claim 1, further including a take-up spindle and a ribbed piece connected to said bracket assembly, said ribbed piece allowing for the labels to not be peeled away from the liner by said stripper, but for allowing the labels to remain on the liner to be wound onto said take-up spindle.

14. A peel assembly as defined in claim 1, wherein said peel assembly is provided in a printer.

15. A peel assembly capable of separating a label from a liner, the label when on the liner forming a media, said peel assembly comprising:

a platen roller;

a bracket;

a stripper which is mounted to said bracket, said stripper capable of stripping the label away from the liner upon tension being applied to the liner;

a pinch roller connected to said bracket, said pinch roller being engaged against said platen roller such that the liner moves between said pinch roller and said platen roller such that said pinch roller pinches the liner between said platen roller and said pinch roller to create tension in the liner; and at least one deflecting roller being connected to said bracket and being positioned between said stripper and said pinch roller, said at least one deflecting roller capable of deflecting the liner away from the label, said at least one deflecting roller being positioned relative to said stripper to provide a large peel angle.

16. A peel assembly as defined in claim 15, wherein said at least one deflecting roller is ribbed such that said at least one deflecting roller has a surface geometry which minimizes surface area contact with the liner.

17. A peel assembly as defined in claim 15, wherein said pinch roller has a diameter of at least 0.385 inches.

18. A peel assembly as defined in claim 15, wherein said peel assembly is provided in a printer.

19. A peel assembly capable of separating a label from a liner, the label when on the liner forming a media, said peel assembly comprising:

a platen roller;

a mounting bracket;

a stripper which is mounted to said mounting bracket, said stripper capable of stripping the label away from the liner upon tension being applied to the liner;

a pivot bracket having a pair of slots therethrough, said pivot bracket being sized such that said pivot bracket can be placed within said mounting bracket;

a pinch roller connected to said pivot bracket, said pinch roller capable of being engaged and disengaged with said platen roller such that the liner moves between said pinch roller and said platen roller such that said pinch roller pinches the liner between said platen roller and said pinch roller to create tension in the liner; and a spring fixed to said mounting bracket and to said pivot bracket, and extending through said slots of said pivot bracket, said spring capable of being deflected, deflection of said spring forces said pinch roller to pinch the liner between said platen roller and said pinch roller, said spring capable of moving within said slots such that said pivot bracket is capable of floating relative to said mounting bracket such that said pinch roller can float toward and away from said platen roller.

20. A peel assembly as defined in claim 19, wherein said pinch roller has a diameter of at least 0.385 inches.

21. A peel assembly as defined in claim 19, further including at least one deflecting roller for deflecting the liner away from the label, said at least one deflecting roller being connected to said mounting bracket and being positioned between and relative to said stripper and said pinch roller to provide a large peel angle.

22. A peel assembly as defined in claim 19, wherein said peel assembly is provided in a printer.

23. A peel assembly as defined in claim 19, wherein said pivot bracket has a tab member extending therefrom which is positioned between said slots of said pivot bracket, said spring being fixed to said tab member of said pivot bracket.

24. A peel assembly as defined in claim 23, wherein said tab member has an aperture provided therethrough, said spring extending through said aperture of said tab member.

25. A peel assembly as defined in claim 19, wherein said mounting bracket has a pair of apertures therethrough, said spring extending through said apertures of said mounting bracket.

26. A peel assembly as defined in claim 19, wherein said pinch roller has a resilient surface.

27. A peel assembly as defined in claim 19, wherein said spring pivotally secures said pivot bracket to said mounting bracket.

28. A peel assembly capable of separating a label from a liner, the label when on the liner forming a media, said peel assembly comprising:

a platen roller;

means for stripping the label from the liner; and a pinch roller capable of pinching the liner against said platen roller to apply tension to the liner, said pinch roller having a diameter of at least 0.385 inches.

29. A peel assembly as defined in claim 28, further including means for allowing said pinch roller to float toward or away from said platen roller.

30. A peel assembly as defined in claim 28, further including spring means associated with said pinch roller, deflection of said spring means forcing said pinch roller to pinch the liner against said platen roller.

31. A peel assembly as defined in claim 28, wherein said pinch roller is formed of rubber.

32. A peel assembly as defined in claim 28, further including means proximate to said stripping means for deflecting the liner away from the label and toward said pinch roller.

33. A peel assembly as defined in claim 28, wherein said peel assembly is provided in a printer.

* * * * *

UNITED STATES PATENT AND TRADEMARK OFFICE
CERTIFICATE OF CORRECTION

PATENT NO. : 6,766,844 B1 Page 1 of 1
DATED : July 27, 2004
INVENTOR(S) : Dane Watkins It is certified that error appears in the above-identified patent and that said Letters Patent is hereby corrected as shown below:

<u>Title page,</u>
Item [73], Assignee, "Zih Corp." should be -- ZIH Corp. --

Signed and Sealed this

Thirtieth Day of November, 2004

JON W. DUDAS
*Director of the United States Patent and Trademark Office*